July 30, 1957  G. SPERLING  2,801,409
ELECTRICALLY OPERATED LEAK DETECTOR
Filed May 15, 1956
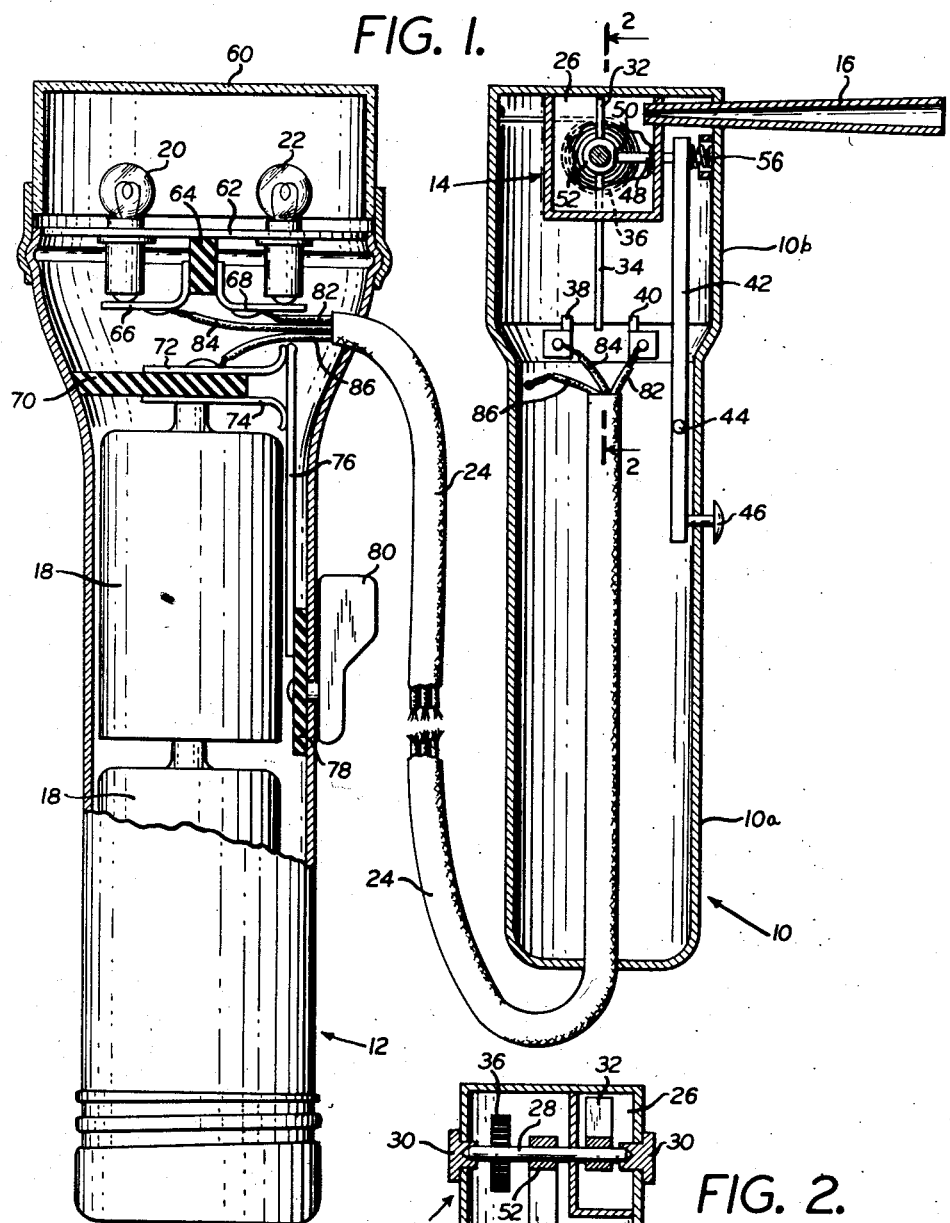
FIG. I.
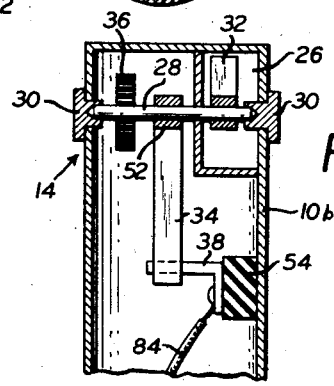
FIG. 2.
INVENTOR
GUSTAV SPERLING.
BY
Mock + Blum
ATTORNEYS.

United States Patent Office 2,801,409
Patented July 30, 1957

2,801,409
ELECTRICALLY OPERATED LEAK DETECTOR

Gustav Sperling, Los Angeles, Calif.

Application May 15, 1956, Serial No. 585,013

7 Claims. (Cl. 340—242)

This invention relates to signalling devices and in particular to a detector for sensing leaks in both pressure and vacuum systems. This application is a continuation-in-part of my co-pending United States patent application Serial No. 380,394, now Patent No. 2,749,536, filed September 16, 1953, and entitled "Electrically Operated Leak Detector."

In the aforementioned patent application, I have disclosed a portable sensing device for detecing pressure and vacuum leaks in conduits or the like, the device comprising a one-piece casing having an external flexible probe communicating with a pressure-responsive element which actuates electrical circuits to energize signal lamps. When the probe contacts a pressure leak one of the lamps is actuated to give a visible signal, while a vacuum leak energizes a different lamp.

An electrical device of this type has distinct advantages over the conventional flame tests for detecting halide leaks by changes of color in the flame, being more rapid and efficient, and usable to detect leaks of all types of gaseous media.

According to the present invention I provide a leak-detecting apparatus of the general type disclosed in said patent application Serial No. 380,394, namely having a pressure-responsive element movable to close a selected circuit through a signal lamp in the presence of a pressure or vacuum leak. The apparatus of the instant invention consists of a pair of portable casings connected by an electric cable, rather than a single casing. One of the casings contains dry-cell batteries and the signal lamps, the latter being mounted at the top of the casing and being visible from above the casing as well as at the sides thereof. The other casing contains the sensing device, an electric switch operated by the sensing device and a probe tube. The probe tube is short, extending from the upper end of the casing, so that the casing itself is grasped by the operator and used for probing.

In the sensing device shown in my co-pending application, a long flexible probe tube was required to permit the operator to probe conduits in inaccessible spots, while the casing and its contained signal lamps were located close to the operator where they would be readily visible. Consequently, the sensing mechanism was located an appreciable distance from the leak source, and the pressure of the leak would be largely dissipated in the long probe tube. According to the present invention, one of the casings itself is used for probing, and the probe tube is made short, the sensing mechanism being located close to the leak source and being thus more sensitive to the leak. The signal lamps may still be located an appreciable distance from the leak source, their casing being connected to the probe casing by the electrical circuit lead wires.

The invention herein also contemplates the use of a rotary sensing device mounted in bearings and counterbalanced by a hair spring, the device being relatively friction-free and being extremely sensitive to pressure or vacuum leaks.

Additional objects and advantages of the invention will be apparent in the course of the following specification when taken in connection with the accompanying drawings, in which:

Fig. 1 is a vertical section of the two casings constituting the signalling device, showing the interior structure therein, the casings being connected by an electric cable which is broken away for convenience of illustration; and Fig. 2 is a section taken along line 2—2 of Fig. 1.

The detector apparatus comprises a pair of portable metal casings, a probe casing 10 and a signal casing 12, both of which are readily portable and are of about the size of a conventional two-cell flashlight. The probe casing 10 contains the sensing element 14 and probe 16, while the signal casing 12 contains dry-cell batteries 18 and electrical signal lamps 20 and 22, and is connected to the casing 10 by a three-lead electrical cable 24.

The probe casing 10 has an elongated lower body portion 10a of sufficient length and diameter to be conveniently grasped in one hand, and an upper portion 10b of larger diameter containing the sensing element 14 and probe 16.

The probe 16 is in the nature of an elongated tube extending through the wall at the top of casing 10 and into a small enclosed chamber 26 at one side of casing 10. The tube may be made of a material which is rigid, semi-rigid, or flexible. A shaft 28 extends through the chamber 26 and across the diameter of casing 10, its ends being journalled in bearings 30 for free rotation, as shown in Fig. 2. A small rectangular blade 32 is keyed to the shaft 28 within the chamber 26, the blade 32 facing and being adjacent to the inner end of probe 16.

A longer blade 34 is also keyed to shaft 28, externally of the enclosed chamber 26. The blade 34 is disposed parallel to blade 32, and is normally depending vertically from shaft 28, while blade 32 is vertically upstanding therefrom. A hair-spring 36 maintains the blades 32 and 34, which are highly balanced, in their normal vertical positions. One end of the hair-spring 36 is fixed to the inner wall of casing 10, while the other end is coiled about the shaft 28 and is connected at the center of the coil to shaft 28.

The bottom end of blade 34 hangs centrally between a pair of electrical contacts 38 and 40 which are fixed to, but electrically insulated from the wall of casing 10 by insulated blocks 54. When the shaft 28 turns in its bearings, the keyed blade 34 swings, bringing its bottom end in contact with one of the two contacts 38 and 40 depending upon the direction of movement. Because the blade 34 is made appreciably longer than blade 32, it will be appreciated that small movements of the blade 32 will be translated into greater movement of the end of blade 34 between contacts 38 and 40.

The mounting of the blade 34 is a very delicately-balanced one, and very slight amounts of pressure or vacuum introduced through probe tube 16 into chamber 26 are sufficient to cause blade 34 to swing back or forth. For this reason, means are provided to prevent accidental movement of the blade 34 into engagement with one of the electrical contacts during handling or storage. Such means comprise a lever arm 42 pivoted at 44 to the wall of the casing 10 and having an actuating button 46 projecting exteriorly of said casing. The top of said lever arm 42 has a perpendicular pin 48 extending proximate to a flat surface 50 on the enlarged hub 52 of blade 34. A compression spring 56 mounted on the wall of casing 10 biases the pin 48 forwardly into contact with or closely proximate to the flattened surface 50 of blade hub 52 so that the pin 48 acts as a stop to limit swinging of the blade 34. When the device is used for sensing, the button 46 is depressed, pivoting the lever arm 42, and moving the pin 48 rearwardly away from the blade hub 52.

The signal casing 12 has an open top closed by a cover 60 of transparent plastic such as Lucite. Mounted within the cover 60, so as to be visible therethrough, are the pair of signal lamps 20 and 22 which are of different colors; one, for example, being green and the other red. The metal lamp bases are set within a metal plate 62 which makes electrical contact with the wall of casing 12.

Depending from the center of plate 62 is an insulating block 64 on which are mounted a pair of circuit connections in the form of contact strips 66 and 68. As shown in Fig. 1 the button terminals of the lamps 20 and 22 rest upon the respective contact strips 66 and 68.

A second insulating block 70 is also mounted on the wall of casing 12, the block 70 carrying a contact strip 72 on its top surface and a contact strip 74 on its bottom surface. The ends of the contact strips 72 and 74 are shown in Fig. 1 electrically connected by a metal strip 76. The metal strip 76 is mounted on an insulating plate which is connected to a manually manipulated finger button 80 of well-known construction, mounted exteriorly of the casing 10 for sliding movement therealong. The finger button 80 may be slid downwardly from its position of Fig. 1 to move the metal strip 76 away from the ends of contact strips 72 and 74 and open the electrical circuit of the lamps.

The pair of batteries 18 are contained at the lower end of the signal casing 12, and have their outer terminals in contact with the casing proper, while their inner terminals are in contact with the lower contact strip 74.

The three leads 82, 84 and 86 of the cable 24 connect the batteries 18 through the switch formed by contacts 38, 40 and blade 34, to the signal lamps 20 and 22. The lead 82 is connected at one end to the lamp contact strip 68 and at its other end to the contact 40 in probe casing 10. Lead 84 is similarly connected at one end to contact strip 66 and at its other end to contact 38. Lead 86 is connected at one end to the upper contact strip 72 and at its other end to the metal body of probe casing 10.

The apparatus operates as follows:

The probe casing 10 is used for probing a conduit or pipe suspected of having a leak therein. The conduit may contain fluid under pressure or vacuum, and the probe tube 16 is run externally over the surface of the conduit, while the button 46 is depressed to disengage stop pin 48.

If the conduit has a pressure leak, the pressure however small, will be transported through the probe tube 16 into the enclosed chamber 26 and will cause the upstanding blade 32 to pivot in a counter-clockwise direction as viewed in Fig. 1. This movement of blade 32 will cause the shaft 28 to rotate in a direction to pivot the depending blade 34 in a counter-clockwise direction until it engages the contact 40. An electrical circuit is now closed through signal lamp 22, this circuit including the center terminals of batteries 18, contact strip 74, slidable metal strip 76, contact strip 72, lead 86 to the metal probe casing 10, blade 34 through its shaft 28 connected to metal casing 10, contact 40, lead wire 82 and lamp contact 68 connected to the inner terminal of lamp 22, the plate 62 and metal body of casing 12 connecting the outer terminal of lamp 22 to the outer terminals of batteries 12.

Responsive to detection of a vacuum leak, the blade 34 will be pivoted in a clockwise direction to engage the contact 38 and complete the circuit for the signal lamp 20 through lead 84.

While a preferred embodiment of the invention has been shown and described herein, it is obvious that numerous additions, changes, and omissions may be made without departing from the spirit and scope of the invention.

I claim:

1. A leak detector comprising a pair of portable casings, one of said casings having an enclosed chamber with an external probe tube in communication therewith, a sensing member mounted in said chamber and movable in different directions in response to pressure and vacuum leaks detected by said probe tube, and double-pole switch means actuated by said sensing member; the other of said casings containing a pair of signal lamps and a source of electrical power, and electrical circuit means connecting the power source to said signal lamps through said signal means for alternate energization of said lamps depending upon the sensing of vacuum and pressure leaks by said probe tube, said circuit including lead wires extending between said pair of casings.

2. A leak detector comprising a pair of portable casings, one of said casings having an enclosed chamber with an external probe tube in communication therewith, a sensing member mounted in said chamber and pivotable in response to leaks detected by said probe tube, an electrically conductive member coupled to said sensing member for movement therewith between a pair of spaced electrical contacts; the other of said casings containing a pair of signal lamps and a source of electrical power; and electrical circuit means connecting each lamp to said power source through a respective electrical contact for energization of the respective lamps in dependence upon the direction of movement of said electrically conductive member governed by the sensing of vacuum and pressure leaks by said probe tube, said circuit means including lead wires extending between said pair of casings.

3. A leak detector for indicating the presence of leaks in conduits under pressure and vacuum, said detector comprising a portable probe casing and a portable signal casing, a pressure responsive sensing device movably mounted in said probe casing and having a normal equilibrium position, a hollow probe tube connected at one of its ends to said probe casing and operatively communicating with said sensing device, the free end of said probe tube being open for probing the conduit being tested, said sensing device being adapted to move in one direction by reason of leaks in conduits under pressure and in a second direction by reason of leaks in conduits under vacuum, first and second normally inactive signalling devices mounted in said signal casing, and means including said pressure-responsive device for activating either of said signalling devices depending on the direction of movement of said pressure-responsive device, said actuating means also including electrical switch means in said probe casing actuated by said pressure-responsive sensing device, and lead wires connecting the switch means in the probe casing with the signalling devices in the signal casing.

4. A leak detector according to claim 3 in which said pressure sensitive device comprises a blade keyed to a shaft journaled in said probe casing, the blade being in communication with said probe tube, said switch means comprising a second blade keyed to said shaft for pivoting movement of its free end between a pair of switch contacts.

5. A leak detector according to claim 4 in which said second blade is longer than said first blade whereby small movements of said first blade are converted to larger movements of the free end of said second blade.

6. A leak detector according to claim 4 in which a hair spring normally maintains the second blade in a neutral position in which its free end is equally-spaced between said switch contacts.

7. A leak detector according to claim 4 in which said signal casing contains an electrical power source, and said signalling devices are electric lamps, said lead wires connecting each lamp to said power source through one of the respective switch contacts.

References Cited in the file of this patent

UNITED STATES PATENTS

| | | |
|---|---|---|
| 2,275,866 | Runaldue | Mar. 10, 1942 |
| 2,600,891 | MacNeille | June 17, 1952 |
| 2,734,960 | Reynolds | Feb. 14, 1956 |